United States Patent [19]
Forgette et al.

[11] Patent Number: 5,825,527
[45] Date of Patent: Oct. 20, 1998

[54] INFORMATION DISPLAY AREA ON ELECTROCHROMIC MIRRORS HAVING A THIRD SURFACE METAL REFLECTOR

[75] Inventors: Jeffrey A. Forgette, Jenison; Scott W. Vander Zwaag, Holland, both of Mich.

[73] Assignee: Gentex Corporation, Zeeland, Mich.

[21] Appl. No.: 831,808

[22] Filed: Apr. 2, 1997

[51] Int. Cl.$^6$ ..................................................... G02F 1/153
[52] U.S. Cl. ........................... 359/267; 359/604; 359/843
[58] Field of Search .................................... 359/267, 271, 359/603, 604, 609, 843, 844

[56] References Cited

U.S. PATENT DOCUMENTS

| | | | |
|---|---|---|---|
| 4,882,565 | 11/1989 | Gallmeyer | 340/461 |
| 5,189,537 | 2/1993 | O'Farrell | 359/71 |
| 5,253,109 | 10/1993 | O'Farrell et al. | 359/604 |
| 5,285,060 | 2/1994 | Larson et al. | 250/214 AL |
| 5,724,187 | 3/1998 | Varaprasad et al. | 359/265 |

FOREIGN PATENT DOCUMENTS

| | | | |
|---|---|---|---|
| WO 95/30495 | 11/1995 | WIPO | B05D 5/06 |

*Primary Examiner*—Georgia Y. Epps
*Assistant Examiner*—Dawn-Marie Bey
*Attorney, Agent, or Firm*—Brian J. Rees

[57] ABSTRACT

An improved electrochromic rearview mirror for motor vehicles, the mirror incorporating an information display area by removing a portion of a reflective and conductive layer on the inside (third) surface of the back glass element of a dimming portion of the rearview mirror and aligning a display device with this information display area. The portion removed is laser ablated to leave lines devoid of reflective material separated by lines of the reflective material. The remaining lines of reflective material are in electrical contact with the remaining reflective and conductive layer on the third surface. The reflective layer forms an integral electrode in contact with the electrochromic media, and may be a single layer of a highly reflective material or may comprise a series of coatings where the outer coating is a highly reflecting material. The other electrode on the inside (second) surface of the front glass is a transparent electrode which also contacts the electrochromic media inside the mirror element.

20 Claims, 1 Drawing Sheet

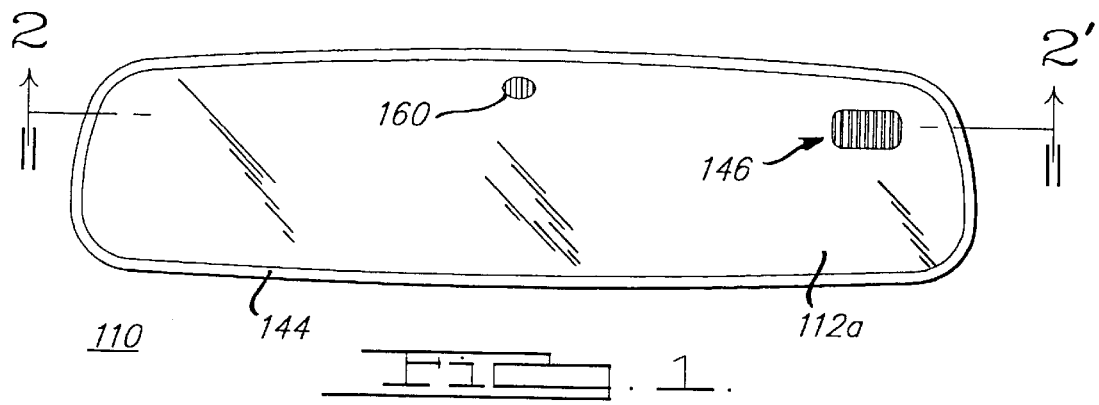
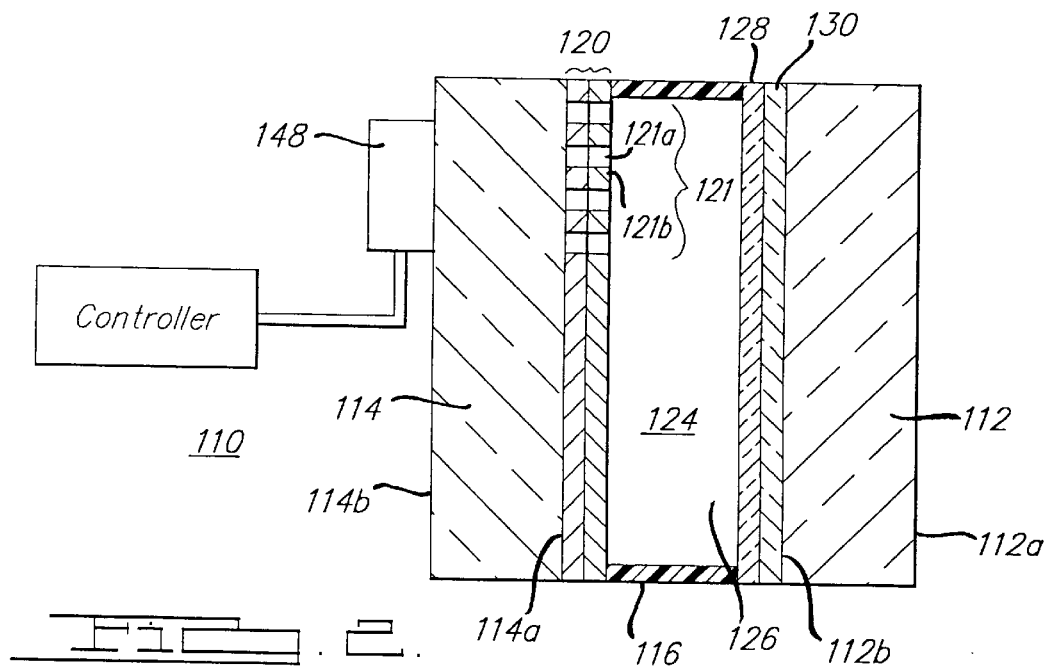
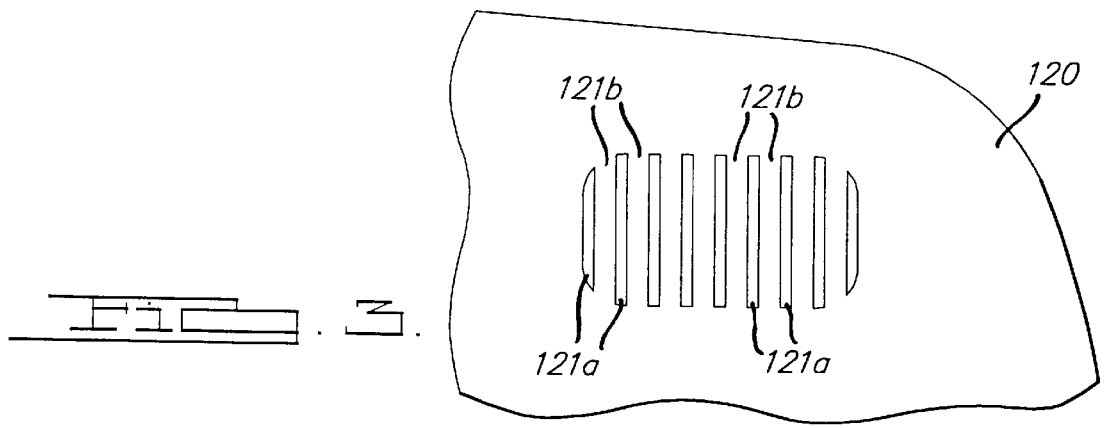

INFORMATION DISPLAY AREA ON ELECTROCHROMIC MIRRORS HAVING A THIRD SURFACE METAL REFLECTOR

BACKGROUND OF THE INVENTION

This invention relates to an information display area on electrochromic mirrors having a third surface reflector for use on motor vehicles and, more particularly, an information display area having conducting portions and non-conducting portions, where the non-conducting portions are created by removing the third surface reflector.

Heretofore, various automatic rearview mirrors for motor vehicles have been devised which automatically change from the full reflectance mode (day) to the partial reflectance mode(s) (night) for glare protection purposes from light emanating from the headlights of vehicles approaching from the rear. The electrochromic mirrors disclosed in U.S. Pat. No. 4,902,108, entitled "Single-Compartment, Self-Erasing, Solution-Phase Electrochromic Devices Solutions for Use Therein, and Uses Thereof", issued Feb. 20, 1990 to H. J. Byker; Canadian Patent No. 1,300,945, entitled "Automatic Rearview Mirror System for Automotive Vehicles", issued May 19, 1992 to J. H. Bechtel et al.; U.S. Pat. No. 5,128,799, entitled "Variable Reflectance Motor Vehicle Mirror", issued Jul. 7, 1992 to H. J. Byker; U.S. Pat. No. 5,202,787, entitled "Electro-Optic Device", issued Apr. 13, 1993 to H. J. Byker et al.; U.S. Pat. No. 5,204,778, entitled "Control System For Automatic Rearview Mirrors", issued Apr. 20, 1993 to J. H. Bechtel; U.S. Pat. No. 5,278,693, entitled "Tinted Solution-Phase Electrochromic Mirrors", issued Jan. 11, 1994 to D. A. Theiste et al.; U.S. Pat. No. 5,280,380, entitled "UV-Stabilized Compositions and Methods", issued Jan. 18, 1994 to H. J. Byker; U.S. Pat. No. 5,282,077, entitled "Variable Reflectance Mirror", issued Jan. 25, 1994 to H. J. Byker; U.S. Pat. No. 5,294,376, entitled "Bipyridinium Salt Solutions", issued Mar. 15, 1994 to H. J. Byker; U.S. Pat. No. 5,336,448, entitled "Electrochromic Devices with Bipyridinium Salt Solutions", issued Aug. 9, 1994 to H. J. Byker; U.S. Pat. No. 5,434,407, entitled "Automatic Rearview Mirror Incorporating Light Pipe", issued Jan. 18, 1995 to F. T. Bauer et al.; U.S. Pat. No. 5,448,397, entitled "Outside Automatic Rearview Mirror for Automotive Vehicles", issued Sep. 5, 1995 to W. L. Tonar; and U.S. Pat. No. 5,451,822, entitled "Electronic Control System", issued Sep. 19, 1995 to J. H. Bechtel et al., each of which patents is assigned to the assignee of the present invention and the disclosures of each of which are hereby incorporated herein by reference, are typical of modem day automatic rearview mirrors for motor vehicles. Such electrochromic mirrors may be utilized in a fully integrated inside/outside rearview mirror system or as an inside or an outside rearview mirror system. In general, in automatic rearview mirrors of the types disclosed in the above referenced U.S. Patents, both the inside and the outside rearview mirrors are comprised of a relatively thin electrochromic medium sandwiched and sealed between two glass elements.

In most cases, when the electrochromic medium which functions as the media of variable transmittance in the mirrors is electrically energized, it darkens and begins to absorb light, and the more light the electrochromic medium absorbs the darker the mirror becomes. When the electrical voltage is decreased to zero, the mirror returns to its clear state. In general, the electrochromic medium sandwiched and sealed between the two glass elements is comprised of self-erasing solutions of electrochromic materials, although other electrochromic media may be utilized, including an approach wherein a tungsten oxide electrochromic layer is coated on one electrode with a solution containing another redox active material to provide counter electrode reaction. When operated automatically, the rearview mirrors of the indicated character generally incorporate light-sensing electronic circuitry which is effective to change the mirrors to the dimmed reflectance modes when glare is detected, the sandwiched electrochromic medium being activated and the mirror being dimmed in proportion to the amount of glare that is detected. As glare subsides, the mirror automatically returns to its normal high reflectance state without any action being required on the part of the driver of the vehicle.

The electrochromic medium is disposed in a sealed chamber defined by a transparent front glass element, a peripheral edge seal, and a rear mirror element having a reflective layer, the electrochromic medium filling the chamber. Conductive layers are provided on the inside of the front and rear glass elements, the conductive layer on the front glass element being transparent while the conductive layer on the rear glass element may be transparent or the conductive layer on the rear glass element may be semi-transparent or opaque and may also have reflective characteristics and function as the reflective layer for the mirror assembly. The conductive layers on both the front glass element and the rear glass element are connected to electronic circuitry which is effective to electrically energize the electrochromic medium to switch the mirror to nighttime, decreased reflectance modes when glare is detected and thereafter allow the mirror to return to the daytime, high reflectance mode when the glare subsides as described in detail in the aforementioned U.S. Patents. For clarity of description of such a structure, the front surface of the front glass element is sometimes referred to as the first surface, and the inside surface of the front glass element is sometimes referred to as the second surface. The inside surface of the rear glass element is sometimes referred to as the third surface, and the back surface of the rear glass element is sometimes referred to as the fourth surface.

In the past, information or images or symbols from displays such as vacuum fluorescent displays have been displayed on electrochromic rearview mirrors for motor vehicles with reflective layers on the fourth surface of the mirror. The display is visible to the vehicle occupant by removing all of the reflective layer on a portion of the fourth surface and placing the display in that area. Although this design works adequately due to the transparent conductors on the second and third surface to impart current to the electrochromic medium, presently no design is commercially available which allows a display device to be incorporated into a mirror that has a reflective layer on the third surface. Removing all of the reflective layer on the third surface in the area aligned with the display area or the glare sensor area causes severe residual color problems when the electrochromic medium darkens and clears because, although colorization occurs at the transparent electrode on the second surface, there is no corresponding electrode on the third surface to balance the charge. As a result, the color generated at the second surface (across from the display area or the glare sensor area) will not darken or clear at the same rate as other areas with balanced electrodes. This color variation is significant and is very aesthetically unappealing to the vehicle occupants.

Consequently, it is desirable to provide an information display area and glare sensor area for an electrochromic mirror having a reflective layer on the third surface to allow more uniform coloration and clearing of the mirror.

OBJECTS OF THE INVENTION

Accordingly, a primary object of the present invention is to provide an improved, robust, low cost information display area and glare sensor area for an electrochromic rearview mirror incorporating a third surface reflector, which mirror is capable of operating in harsh environments over wide variations in temperature, humidity, vibration, atmospheric corrosion, salt spray, electronic disturbances, and sand and grit, and which is relatively economical to manufacture and assemble, and is durable, efficient and reliable in operation.

Another object of the present invention is to provide an information display area for a dimmable rearview mirror incorporating a third surface reflector wherein excellent speed of reflectance change as well as good visibility of the display device are obtained.

Still another object of the present invention is to ensure that the light-absorbing species within the information display area (or the glare sensor area), and the light-absorbing species within a corresponding portion of the transparent electrode on the second surface, will be generated and will clear at approximately the same rate as other areas with completely balanced electrodes.

SUMMARY OF THE INVENTION

The above and other objects, which will become apparent from the specification as a whole, including the drawings, are accomplished in accordance with the present invention by providing a information display area by removing a portion of a reflector/electrode on the inside (third) surface of the back glass element of a dimming portion of the rearview mirror and aligning a display device with this information display area. Additionally, another removed portion of the third surface reflector/electrode may be aligned with a glare light sensor. The portion removed is preferably laser ablated to leave areas devoid of reflective material, thus creating transparent areas that are separated by areas of the reflective material. The areas of reflective material are in electrical contact with the remaining reflective and conductive layer on the third surface. The reflector/electrode forms an integral electrode in contact with the electrochromic media, and may be a single layer of a highly reflective material or may comprise a series of coatings where the outer coating is a highly reflecting material. The other electrode on the inside (second) surface of the front glass is a transparent electrode which also contacts the electrochromic media inside the mirror element. The information display area of the reflective layer that is aligned with the display device should ensure that the light-absorbing species within the display area (or the glare sensor area), and the light-absorbing species within a corresponding portion of the transparent electrode on the second surface, will be generated and will clear at approximately the same rate as other areas with completely balanced electrodes.

BRIEF DESCRIPTION OF THE DRAWINGS

The subject matter which is regarded as the invention is particularly pointed out and distinctly claimed in the concluding portion of the specification. The invention, together with further objects and advantages thereof, may best be understood by reference to the following description taken in connection with the accompanying drawings, where like numerals represent like components, in which:

FIG. 1 is a front elevational view of an automatic rearview mirror embodying the information display area of the present invention;

FIG. 2 is an enlarged cross sectional view, with portions broken away for clarity of illustration, of the automatic rearview mirror illustrated in FIG. 1; and FIG. 3 is a front elevational view of the information display area, with portions broken away for clarity of illustration, of the automatic rearview mirror illustrated in FIG. 1.

DETAILED DESCRIPTION

FIG. 1 shows a front elevational view schematically illustrating an inside mirror assembly 110 which is adapted to be installed on a motor vehicle in a conventional manner and where the mirror faces the rear of the vehicle and can be viewed by the driver of the vehicle to provide a rearward view to the driver. Inside mirror assembly 110 may incorporate light-sensing electronic circuitry of the type illustrated and described in the above-referenced Canadian Patent No. 1,300,945; U.S. Pat. No. 5,204,778; or U.S. Pat. No. 5,451,822, and other circuits capable of sensing glare and ambient light and supplying a drive voltage to the electrochromic element.

Rearview mirrors embodying the present invention preferably include a bezel 144, which extends around the entire periphery of mirror assembly 110. The bezel 144 conceals and protects the spring clips (not shown) and the peripheral edge portions of sealing member and both the front and rear glass elements (described in detail below). A wide variety of bezel designs are well known in the art, such as, for example, the bezel disclosed in above-referenced U.S. Pat. No. 5,448,397. There are also a wide variety of known housings for attaching the mirror assembly 110 to the inside front windshield of an automobile; a preferred housing is disclosed in abovereferenced U.S. Pat. No. 5,337,948.

The electrical circuit preferably incorporates an ambient light sensor (not shown) and a glare light sensor 160, the glare light sensor being capable of sensing glare light and being typically positioned behind the glass elements and looking through a section of the mirror with the reflective material partially removed in accordance with the present invention. Alternatively, the glare light sensor can be positioned outside the reflective surfaces, e.g., in the bezel 144. Additionally, an area or areas of the third surface reflective electrode, such as 146, may be partially removed in accordance with the present invention to permit a display, such as a compass, clock, or other indicia, to show through to the driver of the vehicle. The present invention is also applicable to a mirror which uses only one video chip light sensor to measure both glare and ambient light and which is further capable of determining the direction of glare. An automatic mirror on the inside of a vehicle, constructed according to this invention, can also control one or both outside mirrors as slaves in an automatic mirror system.

FIG. 2 shows a cross-sectional view of mirror assembly 110 along the line 2–2'. Mirror 110 has a front transparent element 112 having a front surface 112a and a rear surface 112b, and a rear element 114 having a front surface 114a and a rear surface 114b. Since some of the layers of the mirror are very thin, the scale has been distorted for pictorial clarity. Also, for clarity of description of such a structure, the following designations will be used hereinafter. The front surface of the front glass element (as viewed by a vehicle occupant) will be referred to as the first surface and the back surface of the front glass element as the second surface. The front surface of the rear glass element will be referred to as the third surface, and the back surface of the rear glass element as the fourth surface.

Front transparent element 112 may be any material which is transparent and has sufficient strength to be able to operate in the conditions, e.g., varying temperatures and pressures, commonly found in the automotive environment. Front element 112 may comprise any type of borosilicate glass, soda lime, float glass or any other material, such as, for example, a polymer or plastic, that is transparent in the visible region of the electromagnetic spectrum. Front element 112 is preferably a sheet of glass. Rear element 114 must meet the operational conditions outlined above, except that it does not need to be transparent, and therefore may comprise polymers, metals, glass, ceramics, and preferably is a sheet of glass. Front and rear elements typically have thicknesses of about 2 mm, but may optionally be much thinner if combined with a gel medium as disclosed in commonly assigned co-filed U.S. patent application Ser. No. 08/834,783 entitled "A ELECTROCHROMIC MIRROR WITH TWO THIN GLASS ELEMENTS AND A GELLED ELECTROCHROMIC MEDIUM" and filed on Apr. 2, 1997, the entire disclosure of which is hereby incorporated herein by reference.

A layer of a transparent electrically conductive material 128 is deposited on the second surface 112b to act as an electrode. Transparent conductive material 128 may be any material which bonds well to front element 112, is resistant to corrosion to any materials within the electrochromic device, resistant to corrosion by the atmosphere, has minimal diffuse or specular reflectance, high light transmission, neutral coloration and good electrical conductance. Transparent conductive material 128 may be fluorine doped tin oxide, tin doped indium oxide (ITO), ITO/metal/ITO (IMI) as disclosed in "Transparent Conductive Multilayer-Systems for FPD Applications", by J. Stollenwerk, B. Ocker, K. H. Kretschmer of LEYBOLD AG, Alzenau, Germany, and the materials described in above-referenced U.S. Pat. No. 5,202, 787, such as TEC 20 or TEC 15, available from Libbey Owens-Ford Co. of Toledo, Ohio. Generally, the conductivity of transparent conductive material 128 will depend on its thickness and composition. The transparent conductive material should adhere well to the second (glass) surface 112b, and maintain this bond when the epoxy seal 116 bonds thereto. If desired, an optional layer or layers of a color suppression material 130 may be deposited between transparent conductive material 128 and front glass rear surface 112b to suppress the reflection of any unwanted portion of the electromagnetic spectrum.

At least one layer of a material that acts as both a reflector and a conductive electrode 120 is disposed on third surface 114a of mirror 110. U.S. patent application Ser. No. 08/832, 587 entitled "DIMMABLE REARVIEW MIRROR INCORPORATING A THIRD SURFACE METAL REFLECTOR" and filed on Apr, 2, 1997, describes reflector/electrode 120 in detail. The entire disclosure of this co-pending U.S. Patent Application is hereby incorporated herein by reference. Generally speaking, the transparent conductive electrode on the third surface is replaced with a layer that is conductive and reflective (reflector/electrode 120). The reflector/electrode typically has a base layer that bonds well to the glass surface 114a and a highly reflecting layer disposed over the base layer. Optionally, an intermediate layer may be placed between the base layer and the highly reflecting layer and, additionally, a very thin flash over coating may be placed over the highly reflecting layer to improve the ruggedness of the reflector/electrode 120. Since a third surface reflector/electrode 120 has a higher conductivity than a conventional transparent electrode it allows greater design flexibility. The combination of a high conductivity reflector/electrode on the third surface and a high conductivity transparent electrode on the second surface will not only produce an electrochromic device with more even and better overall coloration, but will also increase speed of coloration and clearing. The third surface reflector/electrode 120 should preferably adhere well to the third (glass) surface 114a, and maintain this bond when the epoxy seal 116 bonds thereto.

The coating 120 of the third surface 114a is sealably bonded to the coating 128 on the second surface 112b around their outer perimeters by a seal member 116. Preferably, seal member 116 contains glass beads (not shown) to hold transparent elements 112 and 114 in a parallel and spaced-apart relationship. Seal member 116 may be any material which is capable of adhesively bonding the coatings on the second surface 112b to the coatings on the third surface 114a to seal the perimeter such that electrochromic medium 126 does not leak from chamber 124 while simultaneously maintaining a generally constant distance therebetween. Optionally, the layer of transparent conductive coating 128 and/or the layer of reflector/electrode 120 may be removed over a major portion where seal member is disposed (not the entire portion, otherwise the drive potential could not be applied to the two coatings). In such a case, seal member must bond well to glass.

The performance requirements for a perimeter seal member 116 used in an electrochromic device are similar to those for a perimeter seal used in a liquid crystal device (LCD) which are well known in the art. The seal must have good adhesion to glass, metals and metal oxides, must have low permeabilities for oxygen, moisture vapor and other detrimental vapors and gases, and must not interact with or poison the electrochromic or liquid crystal material it is meant to contain and protect. The perimeter seal can be applied by means commonly used in the LCD industry such as by silk-screening or dispensing. Totally hermetic seals such as those made with glass frit or solder glass can be used, but the high temperatures involved in processing (usually near 450-degrees Centigrade) this type of seal can cause numerous problems such as glass substrate warpage, changes in the properties of transparent conductive electrode and oxidation or degradation of the reflector. Because of their lower processing temperatures, thermoplastic, thermosetting or UV curing organic sealing resins are preferred. Such organic resin sealing systems for LCD's are described in U.S. Pat. Nos. 4,297,401, 4,418,102, 4,695,490, 5,596, 023 and 5,596,024. Because of their excellent adhesion to glass, low oxygen permeability and good solvent resistance, epoxy based organic sealing resins are preferred. These epoxy resin seals may be UV curing, such as described in U.S. Pat. No. 4,297,401, or thermally curing, such as with mixtures of liquid epoxy resin with liquid polyamide resin or dicyandiamide, or they can be homopolymerized. The epoxy resin may contain fillers or thickeners to reduce flow and shrinkage such as fumed silica, silica, mica, clay, calcium carbonate, alumina, etc., and/or pigments to add color. Fillers pretreated with hydrophobic or silane surface treatments are preferred. Cured resin crosslink density can be controlled by use of mixtures mono-functional, di-functional and multi-functional epoxy resins and curing agents. Additives such as silanes or titanates can be used to improve the seal's hydrolytic stability, and spacers such as glass beads or rods can be used to control final seal thickness and substrate spacing. Suitable epoxy resins for use in a perimeter seal member 116 include but are not limited to: "EPON RESIN" 813, 825, 826, 828, 830, 834, 862, 1001F, 1002F, 2012, DPS-155, 164, 1031, 1074, 58005, 58006, 58034, 58901, 871, 872 and DPL-862 available from Shell Chemical Co., Houston, Tex; "ARALITE" GY 6010, GY 6020, CY 9579, GT 7071, XU 248, EPN 1139, EPN 1138, PY 307, ECN 1235, ECN 1273, ECN 1280, MT 0163, MY 720, MY 0500, MY 0510 and PT 810 available from Ciba Geigy, Hawthorne, N.Y.; "D.E.R." 331, 317, 361, 383, 661, 662, 667, 732, 736, "D.E.N." 431, 438, 439 and 444 available from Dow Chemical Co., Midland, Mich. Suitable epoxy curing agents include V-15, V-25 and V-40 polyamides from Shell Chemical Co.; "AJICURE" PN-23, PN-34 and VDH available from Ajinomoto Co., Tokyo, Japan; "CUREZOL" AMZ, 2MZ, 2E4MZ, C11Z, C17Z, 2PZ, 2IZ and 2P4MZ available from Shikoku Fine Chemicals, Tokyo, Japan; "ERISYS" DDA or DDA accelerated with U-405, 24EMI, U-410 and U-415 available from CVC Specialty Chemicals, Maple Shade, N.J.; "AMICURE" PACM, 352, CG, CG-325 and CG-1200 available from Air Products, Allentown, Pa. Suitable fillers include fumed silica such as "CAB-O-SIL" L-90, LM-130, LM-5, PTG, M-5, MS-7, MS-55, TS-720, HS-5, EH-5 available from Cabot Corporation, Tuscola, Ill.; "AEROSIL" R972, R974, R805, R812, R812 S, R202, US204 and US206 available from Degussa, Akron, Ohio. Suitable clay fillers include BUCA, CATALPO, ASP NC, SATINTONE 5, SATINTONE SP-33, TRANSLINK 37, TRANSLINK 77, TRANSLINK 445, TRANSLINK 555 available from Engelhard Corporation, Edison, N.J. Suitable silica fillers are SILCRON G-130, G-300, G-100-T and G-100 available from SCM Chemicals, Baltimore, Md. Suitable silane coupling agents to improve the seal's hydrolytic stability are Z-6020, Z-6030, Z-6032, Z-6040, Z-6075 and Z-6076 available from Dow Corning Corporation, Midland, Mich. Suitable precision glass microbead spacers are available in an assortment of sizes from Duke Scientific, Palo Alto, Calif.

Chamber 124, defined by transparent conductor 128 (disposed on front element rear surface 112b), reflector/electrode 120 (disposed on rear element front surface 114a), and an inner circumferential wall of sealing member 116, is filled with an electrochromic medium 126. Electrochromic medium 126 may be a wide variety of media capable of changing properties such that light traveling therethrough is attenuated such as, for example, include solution-phase redox, solid-state, and metal or viologen salt deposition; however, the presently preferred media are solution phase redox electrochromics, such as those disclosed in above-referenced U.S. Pat. Nos. 4,902,108; 5,128,799, 5,278,693; 5,280,380; 5,282,077; 5,294,376; 5,336,448. Thus, during operation, light rays enter through the front glass 112, the transparent conductive layer 128, and the electrochromic medium 126, before being reflected from the reflector/electrode 120 provided on the third surface 114a of the mirror 110. Light in the reflected rays exit by the same general path traversed in the reverse direction. Both the entering rays and the reflected rays are attenuated in proportion to the degree to which the electrochromic medium 126 is light absorbing.

The layer or layers of reflector/electrode 120 should be stable when in contact with the electrochromic medium 126 (which may include semi-aqueous materials, organic materials, oxygenated materials, acidic materials and/or conductive materials) both when a potential is applied between the reflector/electrode 120 and the transparent electrode 128 and when no potential is applied. The reflector/electrode 120 should not significantly degrade when exposed to Ultra-Violet radiation or when contacted with another metal (typically at the edges for electrical connection to the electronic control circuit), and preferably has the proper conductance for applying the drive voltage. The reflector/electrode 120 should preferably have superior reflectance properties, e.g., having high specular reflectance and color neutrality. Since a portion of all of the layer or layers of reflector/electrode 120 is removed and they will therefore be in contact with the electrochromic medium, all layers must be stable when in contact with the electrochromic medium.

In accordance with the present invention, a portion of conductive reflector/electrode 120 is removed to leave an information display area 121 comprised of a non-conducting area 121a (to view a display) and a conducting area 121b (to color and clear the electrochromic medium), as shown in FIG. 2. Although only shown in detail for the display area 121, the same design may be, and preferably is, used for the glare sensor area (160 in FIG. 1). FIG. 3 shows a front elevational view illustrating information display area 121. Again, since some of the layers of this area are very thin, the scales of the Figures have been distorted for pictorial clarity. The portion of conductive reflector/electrode that is removed 121a is substantially devoid of conductive material, and the portion not removed should be in electrical contact with the remaining area of reflector/electrode 120. That is to say, there are little or no isolated areas or islands of reflector/electrode 120 that are not electrically connected to the remaining portions of the reflector/electrode 120. Also, although the etched areas 121a are shown as U-shaped (FIG. 2), they may have any shape that allows sufficient current flow through lines 121b while allowing the driver to view and read the display 148 through etched areas 121a. The reflector/electrode 120 may be removed by varying techniques, such as, for example, by etching (laser, chemical or otherwise), masking during deposition, mechanical scraping, sandblasting or otherwise. Laser etching is the presently preferred method because of its accuracy, speed and control.

The information display area 121 is aligned with a display device 148 such as a vacuum fluorescent display, cathode ray tube, liquid crystal, flat panel display and the like, with vacuum fluorescent display being presently preferred. The display 148, having associated control electronics, may exhibit any information helpful to a vehicle occupant, such as a compass, clock, or other indicia, such that the display will show through the removed portion 121a to the vehicle occupant.

The area that is substantially devoid of conductive reflector/electrode 121a and the area having conductive reflector/electrode present 121b may be in any shape or form so long as there is sufficient area having conductive material to allow proper coloring and clearing (i.e., reversibly vary the transmittance) of the electrochromic medium, while at the same time having sufficient area substantially devoid of conductive material to allow proper viewing of the display device 148. As a general rule, information display area 121 should have approximately 70–80 percent of its area substantially devoid of conductive material 121a and the conductive material 121b filling the remaining 20–30 percent. The areas (121a and 121b) may have a variety of patterns such as, for example, linear, circular, elliptical, etc. It is presently preferred that areas 121a and 121b form alternating and contiguous lines (see FIG. 3). By way of example, and not to be construed in any way as limiting the scope of the present invention, the lines 121b generally may be approximately 0.002 inches wide and spaced approximately 0.006 inches apart from one another by the lines substantially devoid of conductive material. It should be understood that although the Figures show the lines to be vertical (as viewed by the driver), they may be horizontal or at some angle from vertical. Further, lines 121a need not be straight, although straight vertical lines are presently preferred.

If all of the third surface reflector/electrode 120 is removed in the information display area 121 or in the area aligned with the glare light sensor 160, there will be significant coloration variations between those areas and the remaining portion of the mirror where the reflector/electrode 120 is not removed. This is because, for every electrochromic material oxidized at one electrode there is a corresponding electrochromic material reduced at the other electrode. The oxidation or reduction (depending on the polarity of the electrodes) that occurs on the second surface directly across from the information display area 121 will occur uniformly across the area of the information display area. The corresponding electrochemistry on the third surface will not, however, be uniform. The generation of light-absorbing species will be concentrated at the edges of the information display area (which is devoid of reflector/electrode). Thus, in the information display area 121, the generation of the light-absorbing species at the second surface will be uniformly distributed, whereas the light-absorbing species at the third surface will not, thereby creating aesthetically unappealing color discrepancies to the vehicle occupants. By providing lines of reflector/electrode 120 areas throughout the information display area 121, in accordance with the present invention, the generation of light-absorbing species (at the second and third surfaces) in the information display area will be much closer to the uniformity seen in other areas of the mirror with completely balanced electrodes.

Although those skilled in the art will understand that many modifications may be made, the laser etching may be accomplished by using a 50 watt Nd:YAG laser, such as that made by XCEL Control Laser, located in Orlando, Fla. In addition, those skilled in the art will realize that the power settings, the laser aperture, the mode of the laser (continuous wave or pulsed wave), the speed with which the laser moves across the surface, and the wave form of the laser may be adjusted so suit a particular need. In commercially available lasers there are various wave forms that the laser follows while it ablates the surface coatings. These wave forms include straight lines, sine waves at various frequencies and ramp waves at various frequencies, although many others may be used. In the presently preferred embodiments of the present invention, the areas devoid of reflective material 121a are removed by using the laser in a pulsed wave mode with a frequency of about 3 KHz, having a narrow (e.g., around 0.005 inches) beam width where the laser is moved in a straight line wave form.

While the invention has been described in detail herein in accordance with certain preferred embodiments thereof, many modifications and changes therein may be effected by those skilled in the art without departing from the spirit of the invention. Accordingly, it is our intent to be limited only by the scope of the appending claims and not by way of the details and instrumentalities describing the embodiments shown herein.

What is claimed is:

1. An electrochromic variable reflectance mirror for automotive vehicles, comprising:

front and rear spaced elements, each having front and rear surfaces, said rear surface of said front element having a layer of transparent conductive material disposed thereon, and said front surface of said rear element having at least one layer of a conductive reflector/electrode material disposed thereon, where said front and rear spaced elements are sealably bonded together in a spaced-apart relationship to define a chamber therebetween, said chamber containing an electrochromic reversibly variable transmittance medium in contact with said transparent conductive material and said reflector/electrode;

an information display area disposed within said reflector/electrode having areas containing reflector/electrode and areas substantially devoid of reflector/electrode; and a display that is juxtaposed with said rear surface of said rear element and aligned with said information display area;

where said reflector/electrode material is effective to reflect light through said medium and said front element when said light reaches said reflector/electrode after passing through said front element and said medium.

2. The electrochromic mirror of claim 1, where, within said information display area, said area containing reflector/electrode provides current to reversibly vary the transmittance of said electrochromic medium, and said area devoid of said reflector/electrode allows viewing of said display.

3. The electrochromic mirror of claim 2, where, said area containing reflector/electrode comprises about 70–80 percent of the information display area and said area devoid of reflector/electrode comprises about 20–30 percent of said information display area.

4. The electrochromic mirror of claim 1, where, within said information display area, said area containing reflector/electrode is reflective and electrically conductive.

5. The electrochromic mirror of claim 1, where, within said information display area, said area containing reflector/electrode includes a plurality of lines that are separated by lines substantially devoid of reflector/electrode.

6. The electrochromic mirror of claim 5, where, within said information display area, said area containing reflector/electrode provides sufficient current to reversibly vary the transmittance of said electrochromic medium, and said area devoid of said reflector/electrode allows viewing of said display.

7. The electrochromic mirror of claim 5, where, said area containing reflector/electrode comprises about 70–80 percent of the information display area and said area devoid of reflector/electrode comprises about 20–30 percent of said information display area.

8. The electrochromic mirror of claim 7, where said lines of conductive material and lines devoid of conducive material are horizontal.

9. The electrochromic mirror of claim 7, where said lines of conductive material and lines devoid of conducive material are vertical.

10. The electrochromic mirror of claim 5, where said lines of reflector/electrode have a width of approximately 0.002 inches and said lines devoid of reflector/electrode have a width of approximately 0.006 inches.

11. The electrochromic mirror of claim 1, there the coloration in the information display area is generally uniform with the coloration in the remaining area of reflector/electrode.

12. The electrochromic mirror of claim 1, where, said area containing reflector/electrode comprises about 70–80 percent of the information display area and said area devoid of reflector/electrode comprises about 20–30 percent of said information display area.

13. The electrochromic mirror of claim 1, further comprising a glare sensor area disposed within said reflector/electrode having areas containing reflector/electrode and areas substantially devoid of reflector/electrode.

14. An electrochromic variable reflectance mirror for automotive vehicles, comprising:

front and rear spaced elements, each having front and rear surfaces, said rear surface of said front element having a layer of transparent conductive material disposed thereon, and said front surface of said rear element having at least one layer of a conductive reflector/electrode material disposed thereon, where said front and rear spaced elements are sealably bonded together in a spaced-apart relationship to define a chamber therebetween, said chamber containing an electrochromic reversibly variable transmittance medium in contact with said transparent conductive material and said reflector/electrode;

a glare sensor area disposed within said reflector/electrode having areas containing reflector/electrode and areas substantially devoid of reflector/electrode; and a glare sensor juxtaposed with said rear surface of said rear element and aligned with said glare sensor area;

where said reflector/electrode material is effective to reflect light through said medium and said front element when said light reaches said reflector/electrode after passing through said front element and said medium.

15. The electrochromic mirror of claim 14, where, within said glare sensor area, said area containing reflector/electrode is reflective and electrically conductive.

16. The electrochromic mirror of claim 14, where, within said glare sensor area, said area containing reflector/electrode includes a plurality of lines that are separated by lines substantially devoid of reflector/electrode.

17. The electrochromic mirror of claim 16, where, within said glare sensor area, said area containing reflector/electrode provides sufficient current to reversibly vary the transmittance of said electrochromic medium, and said area devoid of said reflector/electrode allows said glare sensor to sense glare light.

18. The electrochromic mirror of claim 16, where said lines of reflector/electrode and lines devoid of reflector/electrode material are horizontal.

19. The electrochromic mirror of claim 16, where said lines of reflector/electrode have a width of approximately 0.002 inches and said lines devoid of reflector/electrode have a width of approximately 0.006 inches.

20. The electrochromic mirror of claim 14, there the coloration in the glare sensor area is generally uniform with the coloration in the remaining area of reflector/electrode.

* * * * *